(12) United States Patent
Irwin

(10) Patent No.: US 7,263,223 B2
(45) Date of Patent: Aug. 28, 2007

(54) IMAGE MANIPULATION ACCORDING TO PIXEL TYPE

(75) Inventor: Cory Irwin, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 819 days.

(21) Appl. No.: 10/429,379

(22) Filed: May 5, 2003

(65) Prior Publication Data

US 2004/0223643 A1  Nov. 11, 2004

(51) Int. Cl.
G06K 9/34 (2006.01)
G06K 9/48 (2006.01)
(52) U.S. Cl. ............ 382/176; 382/199
(58) Field of Classification Search ............ 382/176, 382/190, 199, 261, 299
See application file for complete search history.

(56) References Cited

U.S. PATENT DOCUMENTS 5,280,546 A * 1/1994 Machida et al. ............ 382/176
5,825,937 A   10/1998 Ohuchi et al.
2002/0031263 A1  3/2002 Yamakawa

FOREIGN PATENT DOCUMENTS

EP  0348145 A   12/1989
EP  0348145 A1  12/1989

* cited by examiner

Primary Examiner—Duy M. Dang

(57) ABSTRACT

A method embodiment includes identifying, in the digital image, pixels of a first object type pixels of a second object type. An edge group is identified that includes pixels of the second object type that at are adjacent to pixels of the first object type. The first object type pixels are manipulated while pixels in the edge group are at least substantially preserved.

42 Claims, 6 Drawing Sheets

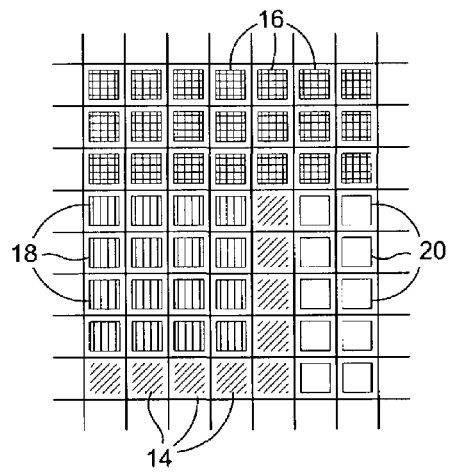
FIG. 3A
| 30 | 30 | 30 | 30 | 30 | 30 | 30 |
|----|----|----|----|----|----|----|
| 30 | 30 | 30 | 30 | 30 | 30 | 30 |
| 30 | 30 | 30 | 30 | 30 | 30 | 30 |
| 15 | 15 | 15 | 15 | 50 | 0  | 0  |
| 15 | 15 | 15 | 15 | 50 | 0  | 0  |
| 15 | 15 | 15 | 15 | 50 | 0  | 0  |
| 15 | 15 | 15 | 15 | 50 | 0  | 0  |
| 50 | 50 | 50 | 50 | 50 | 0  | 0  |
FIG. 3B
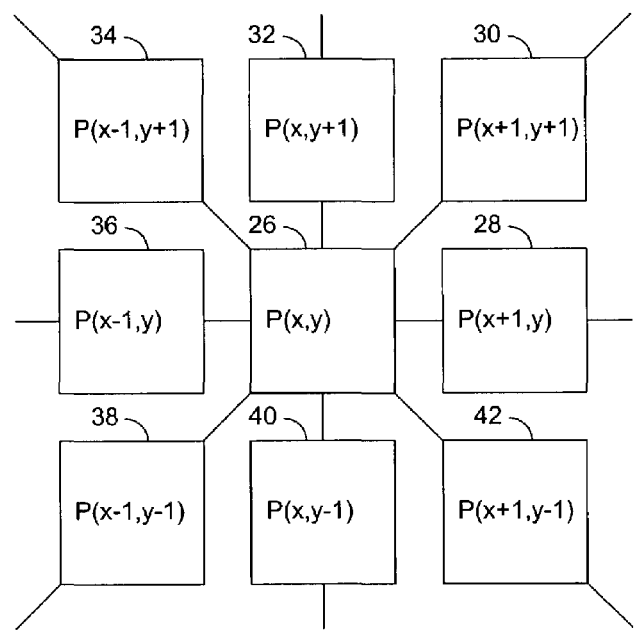
FIG. 4

IMAGE MANIPULATION ACCORDING TO PIXEL TYPE

BACKGROUND

Physical, continuous-tone images such as photographs and paintings can have an unlimited range of colors. In contrast, the range of available colors available for a digital image is limited. When visually displayed, a digital image consists of a grid of pixels selected and arranged to reveal any combination of text and/or graphics. Where two hundred fifty-six or more colors are available for each pixel, the difference between one shade and the next in adjacent pixels becomes difficult if not impossible for the human eye to perceive. A digital image can be one of or incorporated within any number of formats. Format examples include PDL (page description format), PDF (Portable Document Format), and bitmap, TIFF (Tagged Image File Format), and JPEG (Joint Photographic Experts Group).

A digital image can be manipulated by performing one or more operations on its pixels. As examples, a digital image can be scaled to increase or decrease its number of pixels, its pixels can be sharpened, and its pixels can be smoothed. After scaling a digital image such as a scanned color photograph, the transition between adjacent pixels becomes visibly non-continuous. This degradation can cause the image to appear jagged. As a remedy, the scaled but degraded image can be smoothed to create more continuous transitions between adjacent pixels.

However, where the digital image includes text, smoothing can cause a degradation in the perceived print quality. A fine example is black text on a white background. The non-continuous transition allows the text to stand out to the human eye as well as to programming capable of optical character recognition. Smoothing can cause the text pixels to blend into the background substantially reducing a visible transition. Consequently, after enlarging a digital image containing text, smoothing the text pixels is often not desirable.

DESCRIPTION OF THE DRAWINGS

FIG. 3A is a grid representing a selected section of FIG. 1 that includes various adjacent graphic and background pixels.

FIG. 3B is a digital representation of FIG. 3A.

FIG. 4 illustrates a center pixel to be analyzed and compared to adjacent pixels.

DETAILED DESCRIPTION

INTRODUCTION: To improve methods for manipulating digital images, pixels of different object types are identified and then manipulated according to their identified type. Thus, when manipulating the image one operation is performed on pixels of one object type and a second operation is performed on pixels of another object type.

Figure 1:
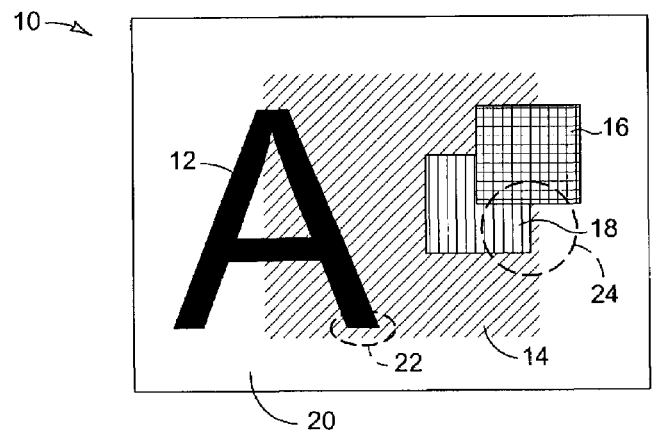
FIG. 1 illustrates a physical representation of a digital image containing text, graphics, and background pixels.

Pixels can be categorized into text, graphics, and background object types. Pixels can be further categorized into pixels of one object type that are adjacent to pixels of another object type—for example—text pixels adjacent to graphic or background pixels and graphic pixels that are adjacent to background pixels. To help illustrate, FIG. 1 shows an image made upon of text pixels 12, graphics pixels 14-18, and background pixels 20.

Text pixels, such as text pixels 12, typically have identifying characteristics. To maintain high visibility, text pixels may have a relatively dark color or have an intensity level that is different from adjacent non-text pixels. The intensity level is such that the transition between text pixels and adjacent graphic or background pixels is highly visible. For example, the text pixels may be black while adjacent background pixels may be white or another color so that the text pixels immediately adjacent to the background pixels are visibly discernable. Text pixels are arranged into uniform groups with each group representing a character. The text pixels of a group are usually uniform. For example, text pixels are often all the same or close to the same color. Each group of text pixels usually takes up less area than the non-text pixels surrounding the group.

Background pixels, such as background pixels 20, usually take up more area than the text pixels they surround and are usually uniform in appearance. In FIG. 1, background pixels 20 are all white. However, background pixels 20 could be another color visibly discernable from text pixels 12.

Graphic pixels, such as graphic pixels 14-18, are a little more difficult to characterize. Graphic pixels are not necessarily uniform. In the example of FIG. 1, graphic pixels 14-18 are all different shades or colors. However, the transition between the different shades or colors of graphic pixels 14-18 is relatively continuous when compared to the transition between text pixels 12 and graphic pixels 14 or the transition between text pixels 12 and background pixels 20.

Figure 2A:
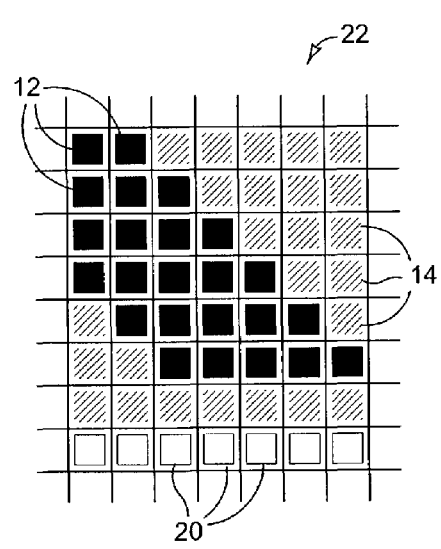
FIG. 2A is a grid representing selected section of FIG. 1 that includes adjacent text, graphic, and background pixels.
Figure 2B:
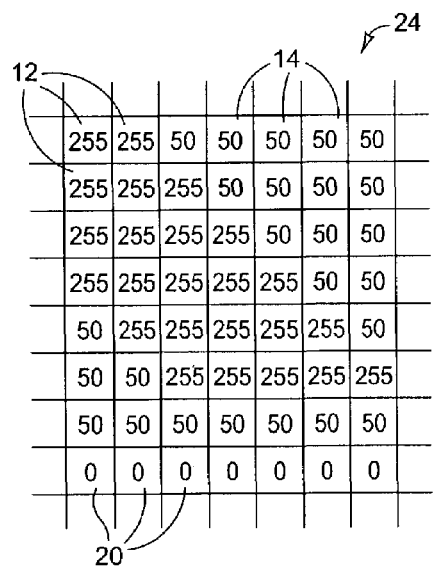
FIG. 2B is a digital representation of FIG. 2A.

To further illustrate, FIGS. 2A and 2B are each grids representing section 22 of FIG. 1. FIG. 2A provides a physical representation of pixels 12, 14, and 20 contained in section 22, while FIG. 2B provides a digital representation of those same pixels. Referring first to FIG. 2A, there is a stark physical contrast between text pixels 12 and graphic and background pixels 14 and 20. That contrast defines visible edges between text pixels 12 and graphic pixels 14. Text pixels along that edge can be referred to as text edge pixels.

FIG. 2B presumes that image 10 is a gray-scale image that can potentially contain two hundred fifty-six different shades ranging from white to black for the case in which an eight bit value is used to specify the intensity. White background pixels are represented by a zero. Black text pixels are represented by the number two hundred fifty-five. Graphic pixels 14, a shade of gray closer to white than black, are represented by the number fifty. In computer terms, each pixel can then be represented by eight bits or one byte. In FIG. 2B, there is a stark numerical contrast between text pixels 12 and graphic and background pixels 14 and 20. It is by identifying this numerical contrast, that programming can identify pixels as text pixels 12 as opposed to graphic pixels 14 or background pixels 20. Programming responsible for manipulating image 10, for example, can preserve identified text pixels 12 by not smoothing graphic or background pixels 14 or 20 into text edge pixels.

FIGS. 3A and 3B are each grids representing section 24 of FIG. 1. FIG. 3A provides a physical representation of pixels 14, 16, 18, and 20 contained in section 24, while FIG. 3B provides a digital representation of those same pixels. Referring first to FIG. 3A, there is a noticeable contrast between graphic pixels 14-18 and background pixels 20. That contrast defines visible edges between graphic pixels 14-18 and background pixels 20. Graphic pixels 14, 16, or 18 along that edge can be referred to as graphic edge pixels.

Like FIG. 2B, FIG. 3B presumes that image 10 is a gray-scale image that can potentially contain two hundred fifty-six different shades ranging from white to black. There is a noticeable numerical contrast between graphic pixels 14-18 and background pixels 20. It is by identifying this numerical contrast, that programming can identify pixels as graphic pixels 14, 16, or 18 as opposed to background pixels 20. Programming responsible for manipulating image 10, for example, can at least substantially preserve the distinction between graphic pixels 14-18 and background pixels 20 by avoiding the smoothing of graphic edge pixels into adjacent background pixels 20.

FIG. 4 illustrates a center pixel 26 to be analyzed and compared to surrounding adjacent pixels 28-42 in order to identify the object type of pixel 26. The following describes a set of methods for identifying pixels according to type. As an example, center pixel 26 can be identified as a text edge pixel if the following are true:

The intensity level, $P(x,y)$, of center pixel 26 exceeds the intensity levels of three or more adjacent pixels (that are also adjacent to one another) by a set threshold value, T. For example, $P(x,y)-P(x+1,y)>T$ and $P(x,y)-P((x+1,y+1)>T$ and $P(x,y)-P(x+1, y-1)>T$.

The intensity level, $P(x,y)$, of center pixel 26 is substantially equal to the intensity level of three or more pixels 28-42 (that are also adjacent to one another). For example, within a small tolerance, $P(x,y)=P(x,y+1)=P(x,y-1)=P(x-1,y)$.

Center pixel 26 can be identified as a non-edge text pixel if the following are true:

The intensity level, $P(x,y)$, of center pixel 26 is substantially equal to the intensity level of six or more adjacent pixels 28-42.

Center pixel 26 is located within a set distance from an identified text edge pixel. For example, center pixel 26 is located within three pixels between a text edge pixel.

Center pixel 26 can be identified as an edge graphic pixel if the following are true:

Center pixel 26 has not been identified as a text pixel.

The intensity level, $P(x,y)$, of center pixel 26 exceeds the intensity levels of three or more adjacent pixels 28-42 (that are also adjacent to one another) by a set threshold value, T. For example, $P(x,y)-P(x+1,y)>T$ and $P(x,y)-P((x+1,y+1)>T$ and $P(x,y)-P(x+1, y-1)>T$.

The difference between the intensity level, $P(x,y)$, of center pixel 26 and the intensity level of three or more adjacent pixels 28-42 is no more than a second threshold level, t. For example $|P(x,y)-P(x,y+1)|<t$ and $|P(x,y)-P(x,y-1)|<t$ and $|P(x,y)-P(x-1,y)|<t$.

Center pixel 26 can be identified as an non-edge graphic pixel if the following are true:

Center pixel 26 has not been identified as a text pixel or as a graphic edge pixel.

The difference between the intensity level, $P(x,y)$, of center pixel 26 and the intensity level of at least five adjacent pixels 28-42 is no more than the second threshold level, t.

Center pixel 26 can be identified as a background pixel if the following are true:

Center pixel 26 has not been identified as a text pixel or as a graphic pixel.

The intensity level, $P(x,y)$, of center pixel 26 is substantially equal to the intensity level of three or more pixels 28-42 (that are also adjacent to one another). For example, within a small tolerance, $P(x,y)=P(x,y+1)=P(x,y-1)=P(x-1,y)$.

Figure 5:
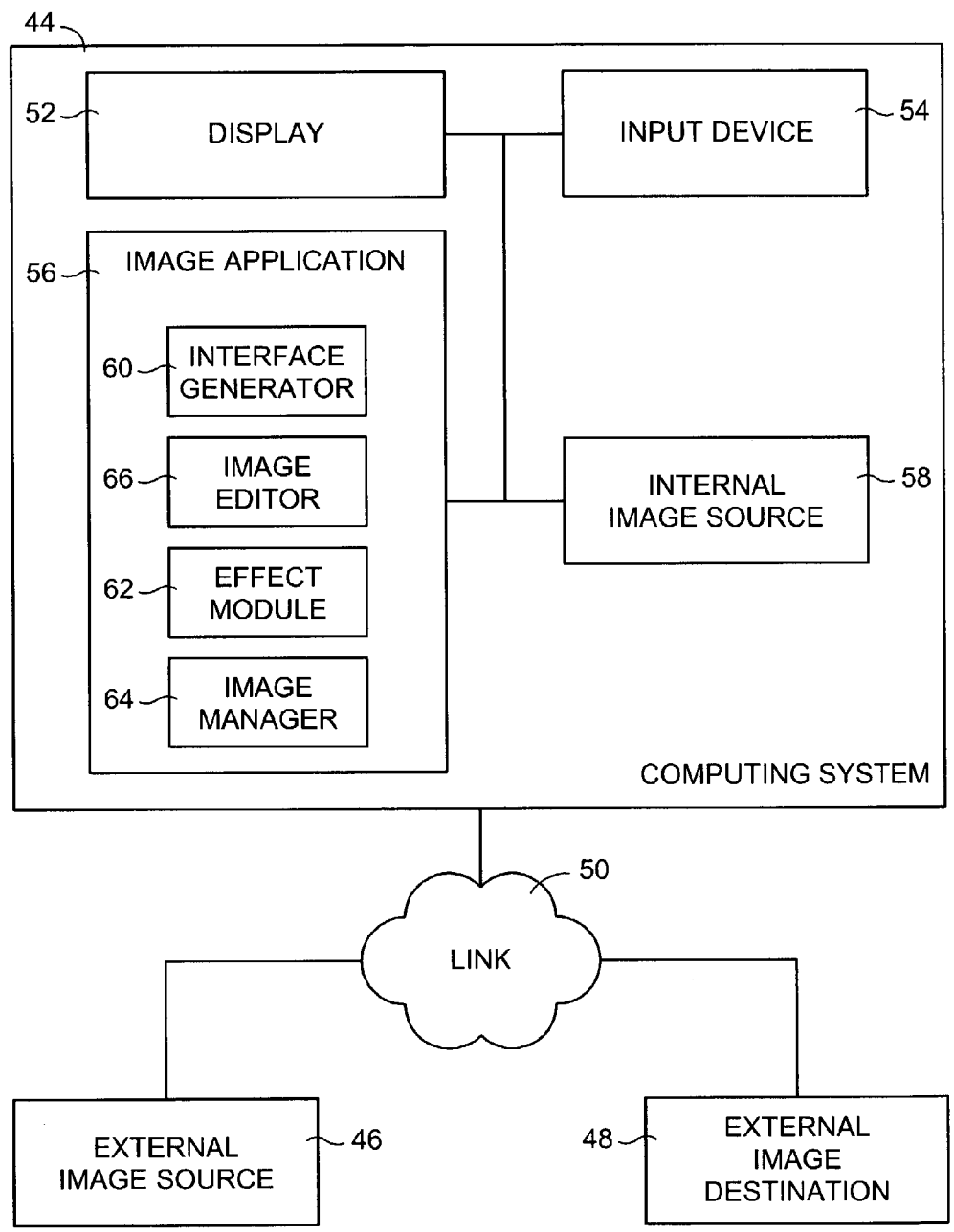
FIG. 5 is a schematic diagram of a computing system with programming for manipulating digital images according to an embodiment of the present invention.
Figure 6:
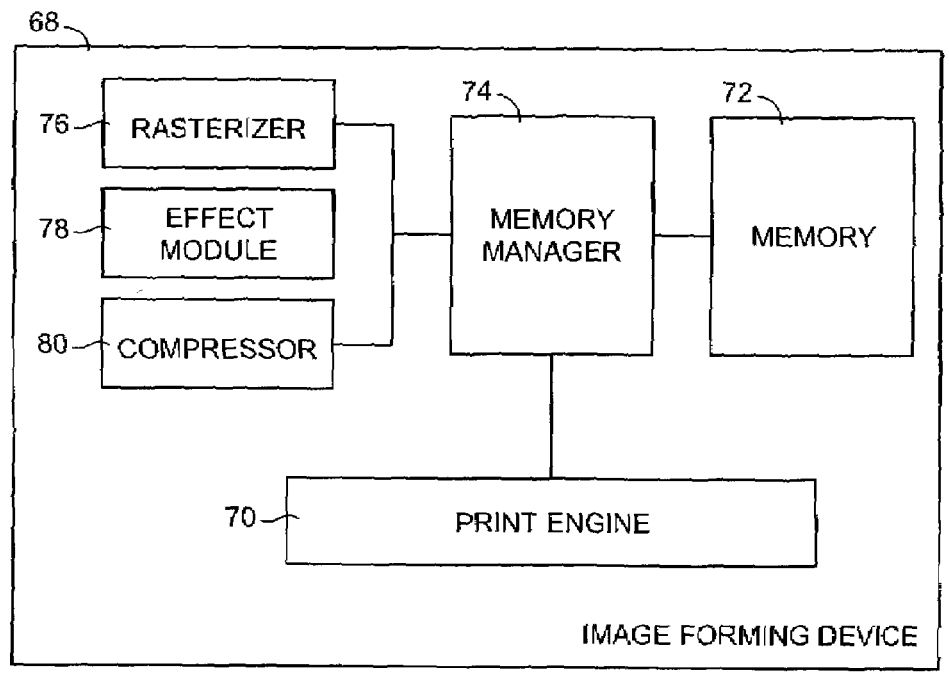
FIG. 6 is a schematic diagram of an image forming device with programming for manipulating digital images according to another embodiment of the present invention.

COMPONENTS: The logical components of various embodiments of the invention will now be described with reference to the block diagrams of FIGS. 5-7. In FIG. 5, an embodiment of the invention is incorporated in programming labeled effect module 62 operating on a computing system. In FIG. 6, an embodiment of the invention is incorporated in programming also labeled effect module 78 operating on an image forming device such as a printer. FIG. 6 illustrates the logical programming elements of an effect module irrespective of the device on which it operates.

FIG. 5 illustrates computing system 44, external image source 46, and external image destination 48 interconnected by link 50. Computing system 44 represents generally any computing system with programming capable of creating or acquiring and then manipulating a digital image. For example, computing system 44 can be a desktop computer, a laptop computer, or a PDA (Personal Digital Assistant). External image source 46 represents generally any combination of programming and/or hardware capable of storing or supplying digital images that can be retrieved by computing system 44. External image destination 48 represents any combination of hardware and/or programming to which computing system 44 may send a manipulated digital image. As examples, external image source 46 may be a scanner, a digital camera, a web site, or a file server, and external image destination 48 may be a image forming device, an electronic mail server, or a web site.

Link 50 represents generally a cable, wireless, or remote connection via a telecommunication link, an infrared link, a radio frequency link, or any other connector, combination of connectors, system, or systems that provides electronic communication between computing system 44, external image source 46, and external image destination 48. Link 50 may represent in whole or in part an intranet, the Internet, or a combination of both.

Among components not shown, computing system includes display 52, input device 54, image application 56, and internal image source 58. Display represents any hardware capable of graphically displaying a user interface. For example, display 52 can be a color monitor capable of displaying a visual representation of a digital image. Input device 54 represents hardware through which a user can direct the operation of image application 56. For example, input device 54 can be a touch pad, a mouse, and/or a keyboard. Image application 56 represents any programming capable of acquiring, creating, and manipulating a digital image. Image application 56 may acquire a digital image from external image source 46 or from internal image source 58. Image application is also capable of sending a manipulated image to external image destination 48. In performing its functions, image application 56 may rely on other intermediary programming such as an operating system (not shown) and/or one or more drivers (not shown).

Image application 56 includes interface generator 60, effect module 62, image manager 64, and image editor 66. Interface generator 60 represents generally any programming capable of acting as an intermediary between the other components of image application 56 and display 52 and input device 54. Interface generator 60 is responsible for directing display 52 to display visual representations of digital images. It is also responsible for directing input received from input device 54 to the other components of image application 56. Received input can include instructions from a user directing how a digital image is to be manipulated.

Effect module 62 represents generally any programming capable of identifying pixels of varying object types within a digital image and manipulating pixels based upon object type. Image manager 64 represents any programming capable of retrieving digital images from internal image source 58 and external image source 46 as well as sending manipulated digital images to external image destination 48.

Image editor 66 represents any programming capable of performing the following functions:
(1) directing image manger 64 to retrieve a digital image;
(2) directing interface generator 60 to display a visual representation of the digital image;
(3) receiving instructions from interface generator concerning how the digital image is to be manipulated;
(4) directing effect module to manipulate the digital image; and
(5) directing image manager 64 to send the manipulated digital image to external image destination 48.

FIG. 6 illustrate the logical and physical components of image forming device 68 which represents generally any device capable of forming a physical representation of a digital image on print media such as paper. Image forming device 68 typically receives a print job from a connected computer or other device not shown. The term print job refers to a series of instructions directing image forming device 68 to form physical representation(s) of digital image(s) on one or more media sheets. The instructions may include directions to form text, graphics, or a combination of both.

Image forming device 68 includes, among components not shown, print engine 70, memory 72, memory manager 74, rasterizer 76, effect module 78, and compressor 80. Print engine 70 represents hardware, and programming for controlling that hardware, capable of printing digital images on media sheets. Memory 72 represents any memory capable of storing digital images (or portions thereof) processed from a print job. Memory manager 74 represents any programming capable of reading from and writing data to memory 72. Memory manger 74 is responsible for sending, as requested, data from memory 72 to print engine 70.

Rasterizer 76 represents generally any programming capable of rendering a print job into a bitmap image that defines each pixel of the print job. Effect module 78 represents generally any programming capable of identifying pixels of varying object types within the bitmap rendered by rasterizer 76 and manipulating pixels based upon object type. Compressor 80 represents programming capable of compressing the binary data stream into a more manageable size to be stored in memory 72 and printed by print engine 70.

Figure 7:
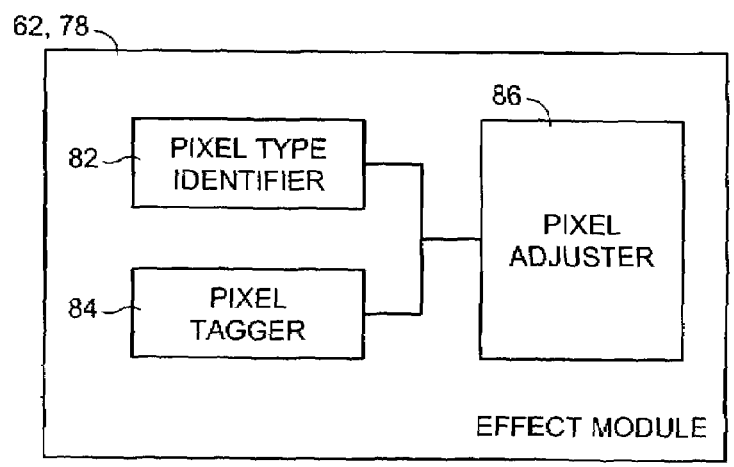
FIG. 7 is a schematic diagram of an effect module according to an embodiment of the present invention.

FIG. 7 illustrates the logical programming elements of effect module 62 and effect module 78. Those elements include pixel type identifier 82, pixel tagger 84, and pixel adjuster 86. Pixel type identifier 82 represents any programming capable of identifying the object type of a pixel. Pixel type identifier 82 may do so using the methods discussed above or any other methods. Pixel tagger 84 represents any programming capable of associating a pixel with its identified object type. Pixel adjuster 86 represents any programming capable of manipulating a pixel according to its associated object type. In other words, pixel adjuster 86 is capable of performing one or more operations on pixels of one object type and performing one or more different operations on pixels of another object type.

Where pixel adjuster 86 is part of image forming device 68 pixel adjuster 86 may operate on pixels not by directly adjusting a bitmap rendered by rasterizer 76. Instead, pixel adjuster 86 may affect the manner in which print engine 70 produces or forms those pixels on a media sheet. For example, where image forming device is a laser printer, pixel adjuster 86 may, in a manner selected to achieve a desired result, modify signals to a laser to form pixels that are smaller than standard pixel size and also offset from pixel center. Alternatively, pixel adjuster 86 may operate directly on the bitmap.

The programming format for elements 82-86 depends upon whether those elements are a part of effect module 66 or effect module 78. For example where elements 82-86 are part of effect module 78 in image forming device 68, elements 82-86 may be incorporated in an ASIC (Application Specific Integrated Circuit).

In performing their respective functions, elements 82-86 may break a digital image into blocks of pixels. Each pixel in a block can have its object type identified, be associated with an identified object type, and then manipulated according to its associated object type. Once each block has been processed as noted above, the blocks can be reassembled into a manipulated, but complete, digital image.

The block diagrams of FIGS. 5-7 show the architecture, functionality, and operation of two implementations of the present invention. Each block may represent in whole or in part a module, segment, or portion of code that comprises one or more executable instructions to implement the specified logical function(s). Each block may represent a circuit or a number of interconnected circuits to implement the specified logical function(s).

Also, embodiments of the present invention can be implemented in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

Figure 8:
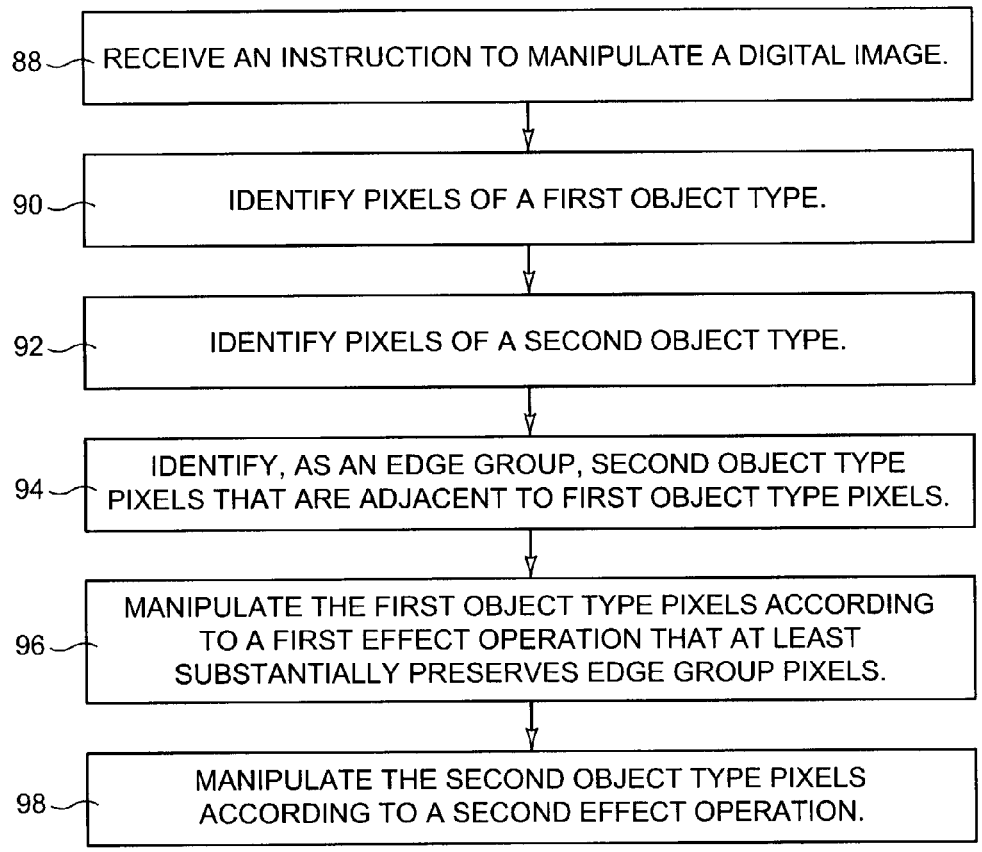
FIG. 8 is a flow diagram illustrating steps taken manipulate an image according to an embodiment of the present invention.
Figure 9:
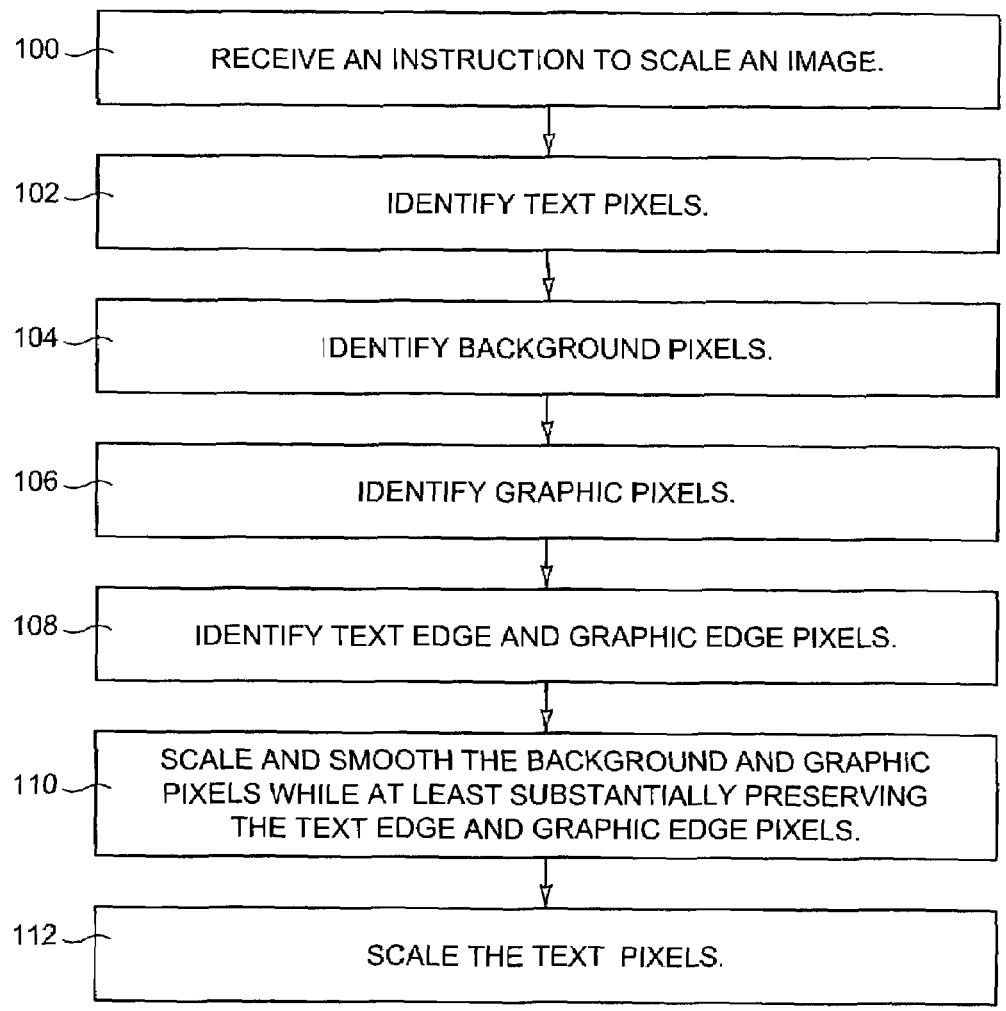
FIG. 9 is a flow diagram illustrating steps taken manipulate an image according to another embodiment of the present invention.

OPERATION: The operation of two possible embodiments of the present invention will now be described with reference to the flow diagrams of FIGS. 8 and 9. FIG. 8 illustrates steps taken to manipulate a digital image in which pixels of different object types are treated differently. FIG. 9 illustrates steps taken to manipulate a digital image in which background, graphic, and text pixels are enlarged. Background and graphic pixels are smoothed while at least substantially preserving text edge and background edge pixels.

Starting with FIG. 8, an instruction to manipulate a digital image is received (step 88). Referring back to FIG. 5, step 88 can be accomplished when image application 56 receives input a user's directions to manipulate a digital image. Referring to FIG. 6, the instructions received in step 88 can instead be included in a print job received by image forming device 68.

The digital image is examined to identify pixels for a first object type (step 90) and of a second object type (step 92). Next, an edge group containing pixels of the second object type that are adjacent to pixels of the first object type (step 94) is identified. Referring back to FIG. 7, steps 90-94 can be accomplished by pixel type identifier 82. For example, first object type pixels may be graphic pixels and second object type pixels may be text pixels. The edge group identified in step 94 would then contain text edge pixels.

The first object type pixels are manipulated according to a first effect operation that at least substantially preserves the edge group pixels (step 96). The second object type pixels are manipulated according to a second effect operation (step 98). Referring back again to FIG. 7, steps 96 and 98 can be accomplished by pixel adjuster 86. Following steps 90-94, pixels are identified and tagged as first object type pixels, second object type pixels and edge group pixels by pixel type identifier 82 and pixel tagger 84. In step 96, pixel adjuster 86 then manipulates first object type pixels in a manner that at least substantially preserves the edge group pixels. In step 98, pixel adjuster 86 manipulates second object type pixels in a different manner.

Referring now to FIG. 9, an instruction to scale a digital image is received (step 100). Referring back to FIG. 5, step 88 can be accomplished when image application 56 receives input a user's directions to manipulate a digital image. Referring to FIG. 6, the instructions received in step 88 can be included in a print job received by image forming device 68.

The digital image is examined to identify text pixels (step 102), background pixels (step 104), graphic pixels (step 106), and text edge and graphic edge pixels (step 108). Referring back to FIG. 7, steps 102-108 can be accomplished by pixel type identifier 82.

Background and graphic pixels are scaled and smoothed while at least substantially preserving text edge and graphic edge pixels (step 110). The text pixels are enlarged (step 112). Referring back again to FIG. 7, steps 110 and 112 can be accomplished by pixel adjuster 86. Following steps 102-108, pixels are identified and tagged as text and text edge pixels, graphic and graphic edge pixels, and background pixels by pixel type identifier 82 and pixel tagger 84. In step 110, pixel adjuster 86 then scales and smoothes graphic and background pixels in a manner that at least substantially preserves text edge and graphic edge pixels. In step 112, pixel adjuster 86 scales the text pixels.

Although the flow charts of FIGS. 8 and 9 show a specific order of execution, the order of execution may differ from that which is depicted. For example, the order of execution of two or more blocks may be scrambled relative to the order shown. Also, two or more blocks shown in succession may be executed concurrently or with partial concurrence. All such variations are within the scope of the present invention.

CONCLUSION: Embodiments of the present invention have been shown and described with reference to the foregoing exemplary embodiments. It is to be understood, however, that other forms, details, and embodiments may be made without departing from the spirit of the invention which is defined in the following claims.

What is claimed is:

1. A method for manipulating a digital image, comprising:
   identifying, in the digital image, pixels of a first object type;
   identifying, in the digital image, pixels of a second object type;
   identifying, in the digital image, background pixels
   identifying, as a first edge group, pixels of the second object type that are adjacent to the pixels of the first object type and the background pixels;
   identifying as a second edge group, pixels of the first object type that are adjacent to the background pixels;
   manipulating the background pixels while at least substantially preserving the pixels in the first and second edge groups; and
   manipulating pixels of the first object type while at least substantially preserving the pixels in the first edge group.

2. The method of claim 1, wherein manipulating the pixels of the first object type comprises manipulating the pixels of the first object type according to a first operation that at least substantially preserves the pixels in the first edge group, the method further comprising manipulating the pixels of the second object type according to a second operation.

3. The method of claim 1, wherein:
   identifying pixels of the first object type comprises identifying non-text pixels;
   identifying pixels of the second object type comprises identifying text pixels; and
   the first edge group includes text edge pixels.

4. The method of claim 3, wherein manipulating pixels of the first object type comprises smoothing non-text pixels while at least substantially preserving the text edge pixels.

5. The method of claim 3, wherein manipulating pixels of the first object type comprises scaling and smoothing non-text pixels while at least substantially preserving the text edge pixels.

6. The method of claim 1, wherein the first edge group includes text edge pixels and the second edge group includes graphic edge pixels and wherein manipulating the background pixels while at least substantially preserving the pixels in the first and second edge groups comprises smoothing background pixels while at least substantially preserving the graphic edge pixels and the text edge pixels.

7. The method of claim 1, further comprising smoothing the pixels of the first object type that are not included in the second edge group.

8. A method for manipulating a digital image, comprising:
   identifying, in the digital image, text pixels;
   identifying, in the digital image, background pixels;
   identifying, in the digital image, graphic pixels;
   identifying, as text edge pixels, the text pixels that are adjacent to the graphic pixels and the text pixels that are adjacent to the background pixels;
   identifying, as graphic edge pixels, the graphic pixels that are adjacent to the background pixels;
   manipulating the background pixels while at least substantially preserving the text edge pixels and the graphic edge pixels; and
   manipulating the graphic pixels while at least substantially preserving the text edge pixels.

9. The method of claim 8, wherein manipulating graphic pixels comprises scaling and smoothing the graphic pixels while at least substantially preserving the text edge pixels.

10. The method of claim 9, further comprising scaling the text pixels.

11. The method of claim 8, wherein:
manipulating the graphic pixels comprises scaling and smoothing the graphic pixels while at least substantially preserving the text edge pixels; and
manipulating the background pixels comprises scaling and smoothing the background pixels while at least substantially preserving the text edge pixels and the graphic edge pixels.

12. The method of claim 11, further comprising scaling the text pixels.

13. The method of claim 11, wherein manipulating the graphic pixels comprises scaling and smoothing the graphic pixels while at least substantially preserving the text edge pixels and the graphic edge pixels.

14. Computer readable media having instructions for:
identifying, in the digital image, pixels of a first object type;
identifying, in the digital image, pixels of a second object type;
identifying, in the digital image, background pixels
identifying, as a first edge group, pixels of the second object type that are adjacent to the pixels of the first object type and the background pixels;
identifying as a second edge group, pixels of the first object type that are adjacent to the background pixels;
manipulating the background pixels while at least substantially preserving the pixels in the first and second edge grounds; and
manipulating pixels of the first object type while at least substantially preserving the pixels in the first edge group.

15. The media of claim 14, wherein the instructions for manipulating the pixels of the first object type comprise instructions for manipulating the pixels of the first object type according to a first operation that at least substantially preserves the pixels in the first edge group, the media having further instructions for manipulating the pixels of the second object type according to a second operation.

16. The media of claim 14, wherein:
the instructions for identifying the pixels of the first object type comprise instructions for identifying non-text pixels; and
the instructions for identifying the pixels of the second object type comprise instructions for identifying text pixels.

17. The media of claim 16, wherein the instructions for manipulating pixels of the first object type comprise instructions for smoothing the non-text pixels while at least substantially preserving the pixels in the first edge group.

18. The media of claim 16, wherein the instructions for manipulating pixels of the first object type comprise instructions for scaling and smoothing the non-text pixels while at least substantially preserving the pixels in the first edge group.

19. The media of claim 14, wherein the first edge group includes text edge pixels and the second edge group includes graphic edge pixels and wherein the instructions for manipulating the background pixels while at least substantially preserving the pixels in the first and second edge groups comprise instructions for smoothing the background pixels while at least substantially preserving the graphic edge pixels and the text edge pixels.

20. The media of claim 14, further comprising instructions for smoothing the pixels of the first object type that are not part of the second edge group.

21. Computer readable media having instructions for:
identifying, in the digital image, text pixels;
identifying, in the digital image, background pixels;
identifying, in the digital image, graphic pixels;
identifying, as text edge pixels, the text pixels that are adjacent to the graphic pixels and the text pixels that are adjacent to background pixels;
identifying, as graphic edge pixels, the graphic pixels that are adjacent to the background pixels; and
manipulating the background pixels while at least substantially preserving the text edge pixels and the graphic edge pixels; and
manipulating the graphic pixels while at least substantially preserving the text edge pixels.

22. The media of claim 21, wherein the instructions for manipulating the graphic pixels comprise instructions for scaling and smoothing the graphic pixels while at least substantially preserving the text edge pixels.

23. The media of claim 22, further comprising instructions for scaling the text pixels.

24. The media of claim 21, wherein:
the instructions for manipulating graphic pixels comprises instructions for scaling and smoothing the graphic pixels while at least substantially preserving the text edge pixels; and
manipulating the background pixels comprise instructions for scaling and smoothing the background pixels while at least substantially preserving the text edge pixels and the graphic edge pixels.

25. The media of claim 24, further comprising instructions for scaling the text pixels.

26. The media of claim 24, wherein the instructions for manipulating the graphic pixels comprise instructions for scaling and smoothing the graphic pixels while at least substantially preserving the text edge pixels and the graphic edge pixels.

27. A system for manipulating a digital image, comprising a computer readable medium having computer executable instructions wherein the instructions when executed function as:
a pixel identifier operable to:
identify, in the digital image, text pixels;
identify, in the digital image, background pixels;
identify, in the digital image, granhic pixels;
identify, as text edae pixels, the text pixels that are adjacent to the graphic pixels and the text pixels that are adjacent to the background pixels;
identify, as graphic edge pixels, the graphic pixels that are adjacent to the background pixels;
a pixel adjuster operable to:
manipulate the background pixels while at least substantially preserving the text edge pixels and the graphic edge pixels; and
manipulate the graphic pixels while at least substantially preserving the text edae pixels.

28. The system of claim 27, further comprising an image forming device, and wherein the pixel adjuster and the pixel identifier are incorporated within the image forming device.

29. The system of claim 27, wherein the pixel adjuster and the pixel identifier are programming elements of an image application.

30. The system of claim 27, wherein the pixel adjuster is operable to manipulate the graphic pixels by smoothing the graphic pixels while at least substantially preserving the text edge pixels.

31. The system of claim 27, wherein the pixel adjuster is operable to manipulate the graphic pixels by scaling and smoothing the graphic pixels while at least substantially preserving the text edge pixels.

32. The system of claim 27, wherein the pixel adjuster is operable to manipulate the background pixels by smoothing the background pixels while at least substantially preserving the graphic edge pixels and text edge pixels.

33. The system of claim 27, wherein the pixel adjuster is operable to manipulate the graphic pixels by smoothing the graphic pixels that are not the graphic edge pixels.

34. The system of claim 27, wherein the pixel identifier and the pixel adjuster are included programming of an image forming device.

35. The system of claim 27, wherein the pixel identifier and the pixel adjuster are programming elements of a computing system.

36. An image forming device comprising:
 a pixel type identifier operable to:
  identify, in the digital image, text pixels;
  identify, in the digital image, background pixels;
  identify, in the digital image, graphic pixels;
  identify, as text edge pixels, the text pixels that are adjacent to the graphic pixels and the text pixels that are adjacent to the background pixels;
 a pixel adjuster operable to:
  manipulate the background pixels while at least substantially preserving the text edge pixels and the graphic edge pixels; and
  manipulate the graphic pixels while at least substantially preserving the text edge pixels; and
 a print engine operable to form pixels of the bitmap as adjusted by the pixel adjuster on a media sheet in order to produce a printed image.

37. The image forming device of claim 36, wherein the pixel adjuster is operable to affect an operation of the pint engine to manipulate the formation of the graphic pixels of the first object while at least substantially preserving the text edge pixels.

38. The image forming device of claim 36, wherein the pixel adjuster is operable to manipulate the graphic pixels by smoothing the graphic pixels while at least substantially preserving the text edge pixels.

39. The image forming device of claim 36, wherein the pixel adjuster is operable to manipulate the graphic pixels by scaling and smoothing the graphic pixels while at least substantially preserving the text edge pixels.

40. The image forming device of claim 36, wherein the pixel adjuster is operable to manipulate the background pixels by smoothing the background pixels while at least substantially preserving the text edge and graphic edge pixels.

41. The image forming device of claim 36, wherein the pixel adjuster is operable to manipulate the graphic pixels by smoothing the graphic pixels that are not the graphic edge pixels.

42. A system for manipulating a digital image, comprising a computer readable medium having computer executable instructions wherein the instructions when executed function as:
 means for identifying, in the digital image, pixels of a first object type;
 means for identifying, in the digital image, pixels of a second object type;
 means for identifying, in the digital image, background pixels
 means for identifying, as first edge group, pixels of the second object type that are adjacent to pixels of the first object type and the background pixels;
 means for maninulating the background pixels while at least substantially preserving the pixels in the first and second edge grounds; and
 means for manipulating first object type pixels while at least substantially preserving the pixels in the first edge group.

* * * * *

UNITED STATES PATENT AND TRADEMARK OFFICE
CERTIFICATE OF CORRECTION

PATENT NO. : 7,263,223 B2 Page 1 of 1
APPLICATION NO. : 10/429379
DATED : August 28, 2007
INVENTOR(S) : Cory Irwin It is certified that error appears in the above-identified patent and that said Letters Patent is hereby corrected as shown below:

On the Title page, in field (57), under "Abstract", in column 2, line 2, after "type" insert -- and --.

On the Title page, in field (57), under "Abstract", in column 2, line 4, after "that" delete "at".

In column 8, line 1, after "spirit" insert -- and scope --.

In column 9, line 30, in Claim 14, delete "grounds" and insert -- groups --, therefor.

In column 10, line 44, in Claim 27, delete "granhic" and insert -- graphic --, therefor.

In column 10, line 45, in Claim 27, delete "edae" and insert -- edge --, therefor.

In column 10, line 55, in Claim 27, delete "edae" and insert -- edge --, therefor.

In column 11, line 34, in Claim 37, delete "pint" and insert -- print --, therefor.

In column 12, line 32, in Claim 42, delete "maninulating" and insert -- manipulating --, therefor.

In column 12, line 34, in Claim 42, delete "grounds" and insert -- groups --, therefor.

Signed and Sealed this

Twelfth Day of August, 2008

JON W. DUDAS
*Director of the United States Patent and Trademark Office*